(12) United States Patent
Vila

(10) Patent No.: US 6,179,339 B1
(45) Date of Patent: Jan. 30, 2001

(54) SEAL RINGS FOR LOW LOSS FLEXIBLE COUPLING OF GAS CONDUITS

(76) Inventor: Smail Vila, 638 Amherst Pl., Louisville, KY (US) 40223

(*) Notice: Under 35 U.S.C. 154(b), the term of this patent shall be extended for 0 days.

(21) Appl. No.: 09/396,920

(22) Filed: Sep. 15, 1999

(51) Int. Cl.[7] .................................................. F16L 17/025
(52) U.S. Cl. ......................... 285/111; 285/231; 285/298; 285/369; 285/345; 285/906; 285/910; 277/618
(58) Field of Search .................................. 285/110, 111, 285/230, 231, 369, 345, 910, 906, 298; 277/465, 530, 553, 615, 618, 625; 267/167

(56) References Cited

U.S. PATENT DOCUMENTS

| | | |
|---|---|---|
| 1,045,460 | 11/1912 | Tudor . |
| 2,070,637 | 2/1937 | Agger ........................................ 288/1 |
| 2,212,335 | 8/1940 | Wenzel ..................................... 309/45 |
| 2,434,484 | 1/1948 | Chambers, Jr. ........................... 288/3 |
| 2,438,794 | 3/1948 | Waring ..................................... 288/3 |
| 2,598,094 | 5/1952 | Augereau ........................... 286/11.16 |
| 2,826,437 | 3/1958 | Detweiler et al. ..................... 285/233 |
| 2,888,281 | 5/1959 | Ratti ................................... 286/11.11 |
| 2,937,037 | 5/1960 | Woolsey ................................ 285/233 |
| 3,405,957 | 10/1968 | Chakroff .................................. 285/93 |
| 3,680,874 | * 8/1972 | Schwarz ................................ 285/111 |
| 3,787,079 | 1/1974 | Yorke et al. .......................... 285/233 |
| 3,827,703 | 8/1974 | Brink ..................................... 277/153 |
| 4,813,713 | 3/1989 | Peaster .................................... 285/13 |
| 4,830,344 | 5/1989 | Balsells ................................. 267/167 |
| 4,974,821 | * 12/1990 | Balsells ................................. 267/167 |
| 5,956,956 | * 9/1999 | Morishita et al. .................... 277/465 |

* cited by examiner

*Primary Examiner*—Dave W. Arola

(57) ABSTRACT

A plastic or polytetrafluoroethylene split seal ring having highly flexible, annularly extending, axially spaced apart side walls is disclosed for sealing opposed, concentrically overlapping open end portions of a pair of gas conduits together or for sealing a sleeve of a flexible coupling to end portions of two opposed, spaced apart gas conduits is disclosed. The ring includes an annularly extending base portion, a pair of axially spaced apart, annularly extending side walls connected to and along opposite sides of the base portion. The side walls project radially beyond a radially inwardly or radially outwardly facing surface of the base portion to form a groove in which an expansion or contraction member can be disposed to effect a gas tight seal of the ring against and around a surface of one of the conduits. A pair of annularly extending, axially spaced apart slots are formed in the base portion next to the side walls to give the side walls enhanced flexibility to form a seal in a ring housing or channel to maintain an effectively gas tight seal between the conduits with axial misaligning movement, translational movement, rotational movement or vibration of the conduits. A third annularly extending slot can be formed on an axial centerline of the base portion so as to open toward the opposing conduit to further increase flexibility of the seal ring.

23 Claims, 3 Drawing Sheets

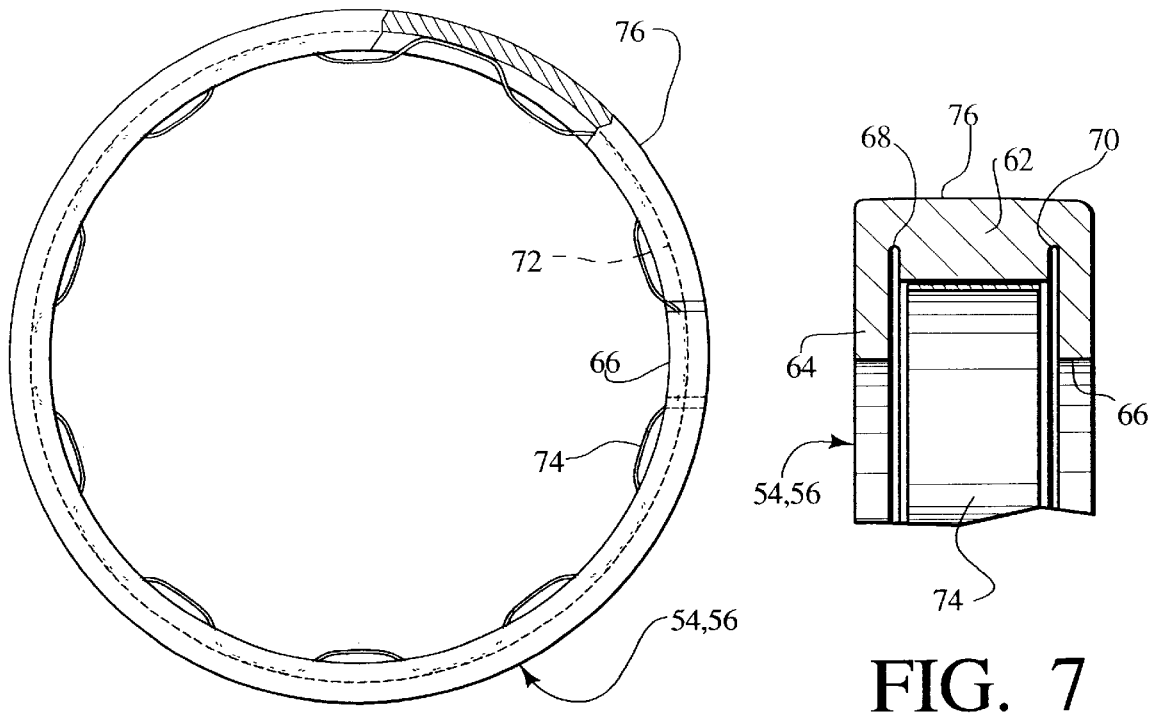
FIG. 6
FIG. 7
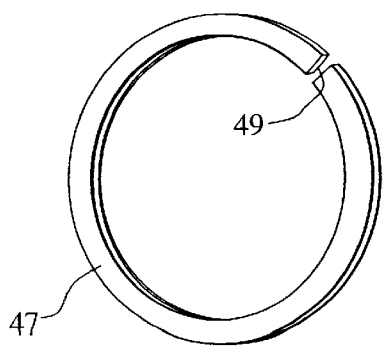
FIG. 8
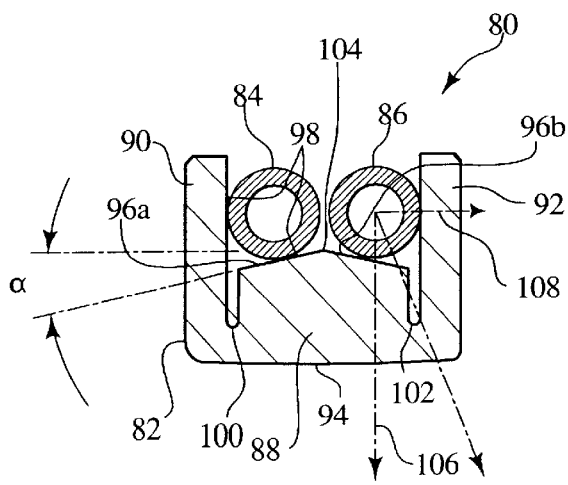
FIG. 9

SEAL RINGS FOR LOW LOSS FLEXIBLE COUPLING OF GAS CONDUITS

BACKGROUND OF THE INVENTION

This invention relates generally to sealing rings and, more specifically, to sealing rings used in the flexible joinder of end portions of two opposed gas conduits for permitting gas flow therebetween during angular misalignment movement or offset, axial translation, axial rotation, and vibration of the conduits with a minimum of gas leakage.

Flexible coupling devices which employ sealing rings for joining gas or air conduits together in an effectively air tight or gas tight manner while permitting the previously mentioned types of movement of the adjoined conduits have, broadly speaking, long been known and used in the prior art. See, for example, the flexible couplings or sleeves and various sealing ring combinations used therewith as disclosed in U.S. Pat. No. 5,106,129 granted to L. A. Camacho et al. on Apr. 21, 1992. Another type of prior art coupling or sleeve (not including the rings shown therewith) for joining high pressure/high temperature air conduits together as used in the commercial air craft industry is shown at 12 in FIG. 1 of the accompanying drawings.

In commercial aircraft the sealing ring assemblies used in the ring housings of flexible coupling sleeves or in ring channels disposed between opposed, concentrically overlapping end portions of gas conduits of different diameters typically operate at air pressures from 40 to 70 psig at temperatures from ambient up to 350 to 500° F. Silicone seal rings have typically been used for this purpose in the prior art. While such prior art seal rings have good flexibility when originally installed and operated at low temperatures of from ambient up to about 200° F., they have a tendency to crack, become cracked and brittle and developed burned spots or areas when subjected to the typical high operating temperature range encountered in gas ducting or conduct systems of commercial jet engines. As a result, they actually suffer a loss of ring material, as through vaporization and become deformed so as to lose certain of their design dimensional characteristics. They also become set so that they can no longer adjust to relative movements of between two gas conduits being sealed by the rings in the sleeve housing or ring channel such that gas leakages occur past the rings.

Other materials, such as polytetrafluoroethylene and certain types of plastics do not encounter these problems in the 350 to 500° F. operating temperature range as does silicone. However, these latter materials are ordinarily not sufficiently flexible to adjust well at low temperatures to vibratory and other movements between adjoined conduits and therefore have not previously been found to be useful as sealing rings in aircraft engine gas or air ducting systems.

By means of my invention, I have developed a sealing ring which can be made of such polytetrafluoroethylene and plastic material which has none of the problems encountered with silicone rings in the 350 to 500° F. operating temperature range, yet is sufficiently flexible at all temperatures from ambient up to and through this typical high temperature range to provide excellent sealing characteristics for adjoined gas conduits which are subject to various vibratory and other movements relative to one another.

SUMMARY OF THE INVENTION

It is an object of my invention to provide one or more seal rings for sealing a sleeve of a flexible coupling to opposed, spaced apart, open end portions of a pair of air or gas conduits in an effectively gas tight manner while allowing for dents and manufacturing irregularities in ring housing portions of the sleeve.

It is another object of my invention to provide one or more seal rings for sealing together in an effectively gas tight manner concentrically interposed or overlapping open end portions of a pair of opposed air of gas conduits of different diameters.

It is a further object of my invention to provide a seal ring assembly for adjoined gas conduits which has excellent flexibility and sealing characteristics in a 40 to 70 psig pressure range at temperatures from ambient up to an operating temperature range of from 350 to 500° F. without encountering ring deterioration ordinarily encountered using prior art silicone seal rings at such operating temperatures.

In accordance with these objects I provide a seal ring which includes an annulus of flexible, resilient material having a generally U-shaped radial cross-section. A pair of legs of the cross-section form axially spaced apart, annularly extending side walls and, together with an annularly extending base portion of the cross-section, forms an endless, annularly extending central groove. A pair of annularly extending axially spaced apart slots are formed in the base portion next to opposing surfaces of the side walls, which slots open into the groove. A spring member is disposed in the groove for urging an edge of the annulus which faces in a radial direction away from the groove to seal against an opposing, conforming, annually extending surface against which the edge is operatively placed.

These and other objects, features and advantages of the present invention will become apparent to those skilled in the art from the following detailed description and attached drawings upon which, by way of example, only a preferred and one other important embodiment of my invention are described and illustrated.

BRIEF DESCRIPTION OF THE DRAWINGS

FIG. 6 shows an axial plan view of one of the rings of FIG. 5 together with an expanding Marcel spring.

FIG. 7 shows an enlarged detail view of the radial cross-section of a fragment of one of the seal rings and Marcel springs of FIG. 5, the same as shown in reduced size in the latter mentioned figure.

FIG. 8 shows a perspective view of a radial butt cut expansion or contraction ring which can be used in place of the Marcel spring or garter spring respectively shown in the previous figures.

FIG. 9 shows a radial cross-section of a fragment of a seal ring such as may be used in a flexible coupling of the type shown in FIG. 1, thus illustrating a preferred embodiment of my invention.

DESCRIPTION OF THE PREFERRED EMBODIMENT

Figure 1:
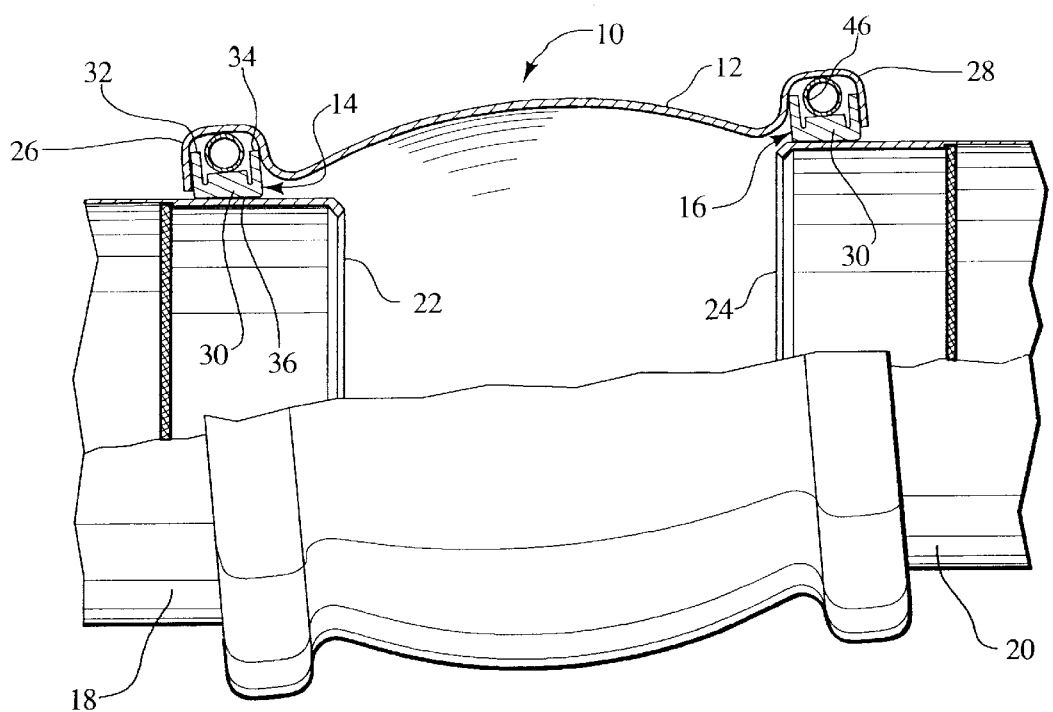
FIG. 1 shows a side view of a sleeve of a conventional coupling adjoining the ends of a pair of opposed, spaced apart and misaligned gas conduits for gas flow therebetween, the sleeve containing a pair of novel seal rings acting in a contracting mode against end portions of the conduits, portions of the conduits and rings being torn away for interior viewing, thus illustrating an important embodiment of my invention.

Referring now to the drawing figures and, in particular, to FIGS. 1–4, there is shown, in an important embodiment of my invention, a flexible coupling, generally designated 10 (FIG. 1 only), including a conventional hollow, open ended sleeve 12 and a novel pair of seal rings, generally designated 14, 16. The sleeve 12 fits on and around opposed, spaced apart end portions of a pair of cylindrically shaped gas or air conduits 18, 20. The conduits 18, 20 are open on their opposing ends 22 and 24 for the flow of gas or air, under pressure, therebetween through the sleeve 12. Notice in FIG. 1 that the conduits, 18, 20 are shown axially misalign relative to one another or vertically offset as viewed. This may be considered either a permanent condition, as where the conduits 18, 20 are permanently slightly misaligned, or a transient condition due to vibration or thermal expansion of the two conduits, as can occur, for example, under certain operating conditions in similarly coupled air conduits in commercial air craft.

Figure 4:
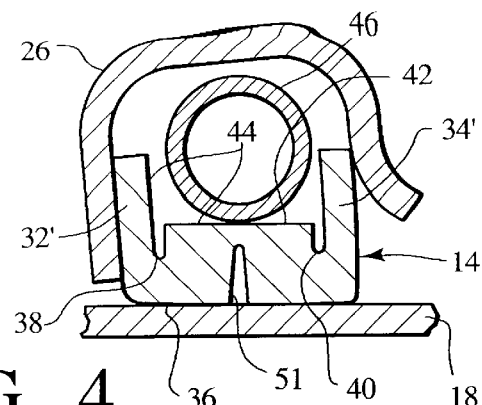
FIG. 4 shows an enlarged detail view of the radial cross-section of a fragment of one of the seal rings and corresponding seal ring housing, the same as viewed in FIG. 1 and illustrating deformation of the side walls of the ring with axial misalignment of the coupling sleeve relative to the gas conduits.

To seal the sleeve 12 in an effectively gas tight manner to the conduits 18, 20, the novel seal rings 14, 16 are disposed in a pair of annularly extending, three sided ring housings 26, 28, respectively, formed on and around opposite open ends of the sleeve. Since the rings 14, 16 are identical, only one of such rings need be fully shown. The rings 14, 16 are preferably constructed of a flexible, resilient polytetrafluoroethylene or plastic and each includes an annularly extending base portion 30 and a pair of axially spaced apart side walls 32, 34 which are integrally joined on radially inner end portions of opposing sides thereof to opposite sides of the base portion 30. The radially inner edges of the side walls 32, 34 and the radially inner facing surface of the base portion 30, together, define a radially interior, circular bore 36 of each of the rings 14, 16 which is adapted to fit snugly on and around the cylindrically shaped outer surface of the conduits 18, 20, respectively. A pair of axially spaced apart, annularly extending, radially outwardly opening slots 38, 40 are formed in radially outer surface portions of the base portion 30 next to opposing sides of the side walls 32 and 34. The slots 38, 40 give added flexibility to the side walls 32, 34 thus permitting them to resiliently deform to provide an effective gas seal against the interior sidewalls of the ring housings 26, 28 upon misaligning movement, rotation, translation, vibration or thermal expansion of the conduits 18, 20 relative to one another. Such resilient deformation of the ring side walls 32, 34 is illustrated in FIG. 4 at 32' and 34'. The rings 14, 16 are split seal rings containing a lap joint, as at 41 in FIGS. 2 and 2a, to permit them being placed in a compression or contraction mode on and around the conduits 18, 20 as later more fully explained. In the alternative, the seal rings 14, 16 may be uncut when adapted for use in a contracting mode as in the present example, although they must be split so as to contain a lap joint when adapted for use in an expanding mode.

Since the ring side walls 32 and 34 are joined along radially inner portions thereof to radially inner side portions of the base portion 30, radially outer end portions of the side walls 32, 34 project radially outwardly beyond an outer peripheral edge 42 of the base portion 30 to form a three sided central groove 44 (See FIGS. 3–4) in which is disposed a spring member such as a coiled, annularly extending garter spring 46. The spring 46 provides a compression force against the base portion 30 to force the ring bore 36 of each of the rings 14, 16 tightly against the outer surface of the corresponding conduit 18, 20. The rings 14, 16 of FIGS. 1–4 thus operate in a contracting or compression mode. Alternatively, a spring member, such as a metal split ring 47 (FIG. 8) containing a standard butt joint 49 operating in compression, can be substituted in and around the groove 44 in place of the garter spring 46 to compress the rings 14, 16 on their corresponding conduits. Also, when use in a contracting mode, the ring 47 need not be a split ring but can be an uncut ring if preferred. A suitable polytetrafluoroethylene for constructing the rings 14, 16 includes, for example, that sold by DSM Engineering Plastic Products, Inc., 1911 East 29$^{th}$ Avenue, North Kansas City, Mo. 64116 under the trademark, Fluorosint 207 or Fluorosint 590.

An optional feature of the rings 14, 16 of FIGS. 1–4 is yet a third annually extending slot 51 formed in the base portion 30 which opens inwardly around the bore 36 against an outer surface of one of the conduits 18, 20. The slot 51 is positioned at the axial center of each of the rings 14, 16 and its height, as measured from the bore 36 radically outwardly, should be slightly above the base of the other two slots 38, 40, as viewed, to give even greater flexibility to the rings 14, 16 than is available where the rings have only the slots 38, 40 without the third slot 51. Two axially spaced apart slots such as the slot 51 could also be formed in the base portion 30 so as to open inwardly on and along the bore 36 to produce additional flexibility in the rings 14, 16 if desired.

Figure 5:
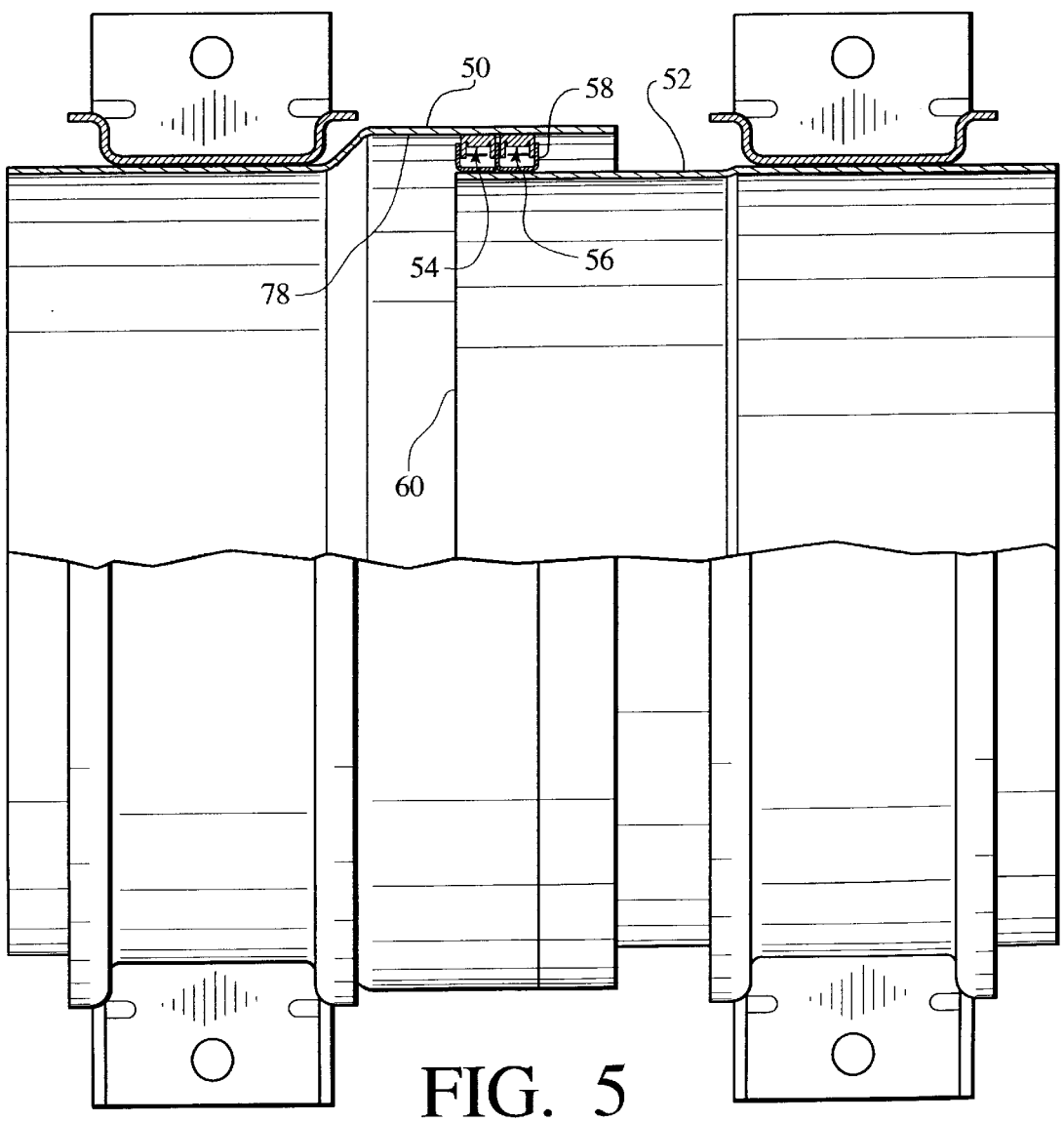
FIG. 5 shows a side view of a concentrically interposed pair of gas conduit end portions having different diameters, a pair of novel seal rings acting in an expansion mode being employed in gas sealing relation between the end portions, portions of the gas conduits and seal rings being torn away for interior viewing, thus illustrating another important embodiment of my invention.

Referring now to FIGS. 5–7, another important embodiment of my invention is shown wherein concentrically interposed or overlapping end portions of two opposed and open ended cylindrical gas or air conduits 50, 52 of different diameters are sealed between one another in an effectively gas tight manner by a pair of novel split seal rings 54, 56. The rings 54, 56 are identical and each includes the same important features as the rings 14, 16 of the previous example, including the lap joints as at 41 in FIGS. 2–2a, except that, in the present example, the rings operate in an expansion mode rather than a compression or contraction mode. Each of the rings 54, 56 is partially disposed in an annularly extending, endless, radially outwardly opening channel 58 attached to and around an exterior surface of the conduit 52 immediately adjacent an open end 60 thereof.

As shown best in FIG. 7, each of the rings 54, 56 include an annularly extending base portion 62, and a pair of annularly extending, axially spaced apart side walls 64, 66 attached on radially outer end portions to opposite sides of the base portion. A pair of annularly extending, spaced apart slots 68, 70 are formed in radially inward surface portions of the base portion 62 immediately next to opposing sides of the side walls 64, 66 so as to open radially inwardly. Radially inward end portions of the side walls 64, 66 project radially inwardly beyond a radially inwardly facing surface 72 of the base portion 62 to form a radially inwardly opening central groove 73 in which an expansion spring member, such as, for example, a Marcel spring 74 is disposed. In the alternative, a conventional, radially outwardly expanding split ring such as at 47 in FIG. 8 and having a butt joint 49 can be inserted in the groove 73 in place of the Marcel spring 74. In either case, the spring 74 or the expansion ring causes a radially outwardly facing surface 76 of each of the rings 54, 56, to bear tightly against an interior surface 78 of the conduit 50 (See also FIG. 5). While a contracting spring ring, such as at 47, for use with the seal rings 14, 16 can be of either a split or uncut type, an expansion type spring ring, such as at 47 for use with expansion type seal rings 54, 56, must be of a radically butt cut type.

As in the previous example, the rings 54, 56 should be constructed of a flexible, resilient material such as plastic or polytetrafluoroethylene. The slots 68, 70 permit the side walls 64, 66 to have increased flexibility so as to maintain an effectively gas tight seal between the conduits 50, 52 with angular or axial misalignment movement, translational movement or vibratory movement thereof. As in the previous example, I prefer to use Fluorosint 207 or Fluorosint 590 polytetrafluoroethylene for construction of the rings 54, 56 because of its ability to function in ambient operating temperatures up to about 600° F. with air or gas operating pressures of up to about 100 psig on a continuous basis or up to 200 psig for about 30 minutes. It will be appreciated that by using a coupling such as shown in U.S. Pat. No. 5,106,129 wherein a sleeve adjoining two opposed, spaced apart conduits is smaller than the two conduits so as to fit into opposite open ends thereof, expansion type seal rings, such as used in the example of FIGS. 5–7 can also be used to seal the sleeve to the conduits.

Figure 2:
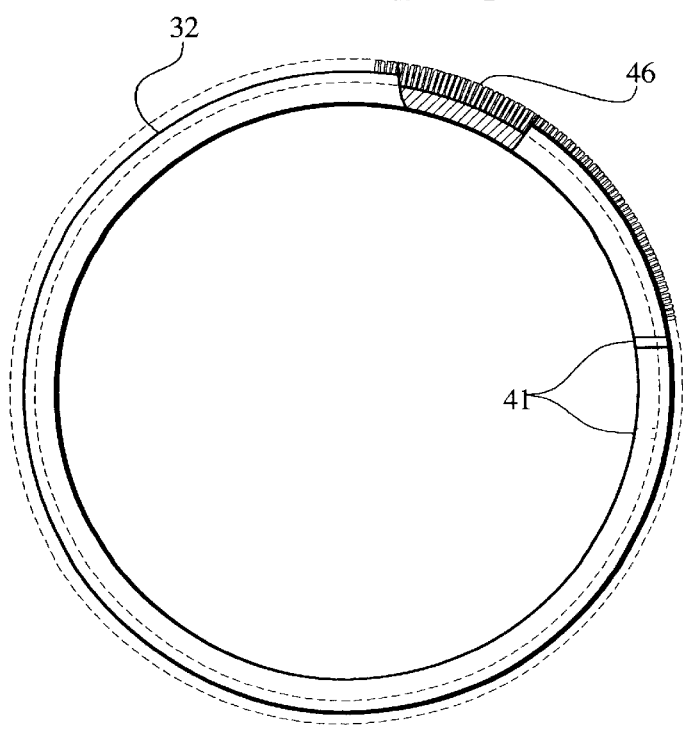
FIG. 2 shows an axial plan view of one of the seal rings of FIG. 1 together with a contracting garter spring.
Figure 2A:
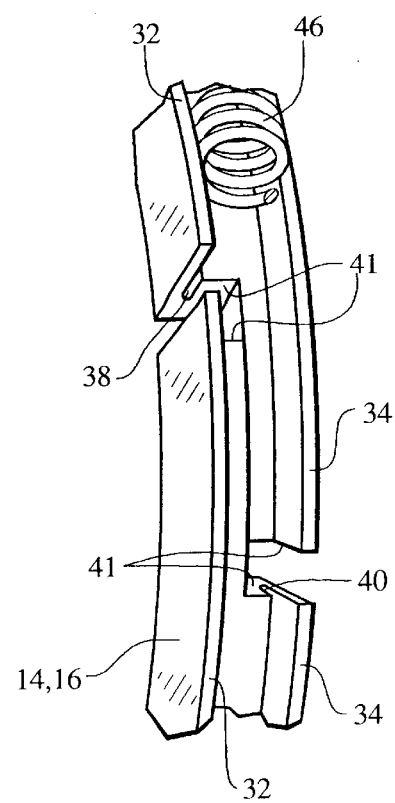
FIG. 2a shows a perspective view of a fragment of the ring and garter spring of FIG. 2 illustrating a radial cut lap joint.
Figure 3:
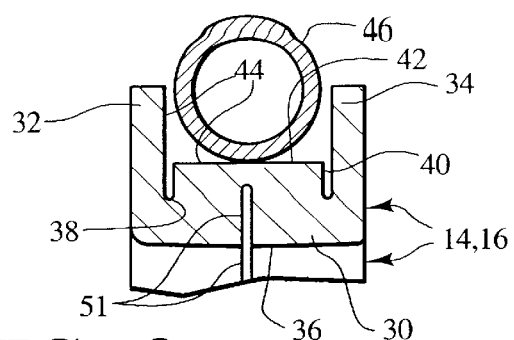
FIG. 3 shows an enlarged detail view of the radial cross-section of a fragment of one of the seal rings of FIG. 1, the same as shown in reduced size in the latter mentioned figure.

Referring now to FIG. 9, there is shown, in a preferred embodiment of my invention, a seal ring assembly, generally designated 80, a different one of which can be used in each of the ring housings 26 and 28 of the sleeve 12 of the coupling shown in FIG. 1 in place of the rings 14 and 16 of the first example of the invention. Only a radially cross-sectioned portion of the ring assembly 80 is shown in FIG. 9 so as to be generic in terms of whether the subject ring assembly is one of the compression type, as in the case of the FIGS. 1–4 example, or is one of the expansion type, as is the case with the FIGS. 5–7 example. It may be equally well adapted for operation in either a compression mode or an expansion mode as desired. The assembly 80 comprises an annularly extending ring or annulus 82 and a pair of conventional metal garter springs 84 and 86. When adapted for operation in a compression mode, the ring 82 may either be a split ring, preferably having a lap joint, such as shown at 41 in FIG. 2a, or it may be uncut and solid throughout its periphery. However, when adapted for operation in an expansion mode, the ring 82 should be of the split ring type such as shown in FIG. 2a. The ring 82 should also be made of a suitable polytetrafluoroethylene or plastic, such as the Fluorosint 207 or Fluorosint 590 mentioned in the previous examples for high temperature applications in the 350° F. 500° F. range as encountered, for example, in commercial aircraft engine air conduit applications.

The ring 82 includes an annularly extending base or base portion 88 and a pair of axially spaced apart, annularly extending sidewalls 90 and 92 attached on corresponding radial end portions to opposite sides of the base 88. An annularly extending first surface 94 of the base 88, which is a conduit bearing surface of the ring 82, faces in a first radial direction for fitting in an effectively gas sealing manner against an opposing conforming surface of a gas conduit, not shown. An annularly extending second surface 96a, b, lying between the sidewalls 90 and 92, faces in a second radial direction opposite the first radial direction. The second surface 96a, b and opposing surfaces of the sidewalls 90 and 92 which project radially beyond the base 88 define an annularly extending groove 98. A pair of annularly extending, axially spaced apart slots 100 and 102 are formed in a surface portion of the base 88 next to the opposing surfaces of the sidewalls 90 and 92 so as to open onto the second surface 96a, b into the groove 98. The second surface 96a, b is crowned, as at 104, on an annularly extending, axial centerline of the ring 82 and contains a pair of oppositely tapered, annularly extending surfaces 96a and 96b. The tapered surfaces 96a and 96b extend diagonally outwardly in opposite axial directions from the crown 104 to form a pair of cone shaped surfaces which are each inclined toward an imaginary circular cylindrical, axially directed projection of the first surface 94. The cone shaped or tapered surfaces 96a and 96b are on opposite angles relative to one another which are equal to an angle a as shown in FIG. 4 and which are inclined toward the imaginary projection of the surface 94, the angle α being within a range of from three degrees to about thirty degrees, inclusive.

The garter springs 84 and 86 are disposed next to one another in the groove 98 such that each of the springs bears upon a different one of the tapered surfaces 96a and 96b. Such an arrangement produces a radially directed bearing force component 106 from each of the springs upon the first surface 94 which combined to cause the surface 94 to form an effectively gas tight seal against the gas conduit in combination with a gas pressure differential which will also exist across the surfaces 94 and 96a, b under operating conditions. Because the springs 84 and 86 bear upon tapered surfaces 96a and 96b respectively, they each provide an opposite, axially outwardly directed force component 108 against a nearest one of the sidewalls 90 and 92 to form an effectively gas tight seal of the sidewalls against opposing annularly extending surfaces of the ring housing in which they are disposed, such as the ring housings 26 and 28 of FIG. 1 for example. Because the angle a of each of the tapered surfaces 96a and 96b will be within the aforementioned range, the axially directed mechanical force component 108 of each of the springs 84 and 86 will fall within a range of from about one to ten percent of the radially directed mechanical force component 106. Typical commercial aircraft operating gas pressures of from about 45 to 70 psig will produce gas pressure differentials radially across the base 88 and axially across each of the sidewalls 90 and 92 which will add to the mechanical force components 106 and 108, respectively, to produce an effective gas tight seal of the ring 82 in and against its housing or channel.

Although the present invention has been shown and described with respect to specific details of certain preferred embodiments thereof, it is not intended that such details limit the scope and coverage of this patent other than as specifically set forth in the following claims.

I claim:
1. A seal ring for providing an essentially gas tight seal between a gas conduit and a flexible coupling or between two concentrically interposed gas conduits of different diameters, said ring comprising
    an annularly extending base portion defining a circular central bore, a radially interior, bore defining surface of said base portion being adapted to fit flush around and against a surface of a circular cylindrical conduit;
    a pair of annularly extending, flexible, resilient, axially spaced apart side walls attached on and along radially inner end portions thereof to opposite sides of said base portion, radially outer end portions of said side walls projecting radially outwardly beyond a radially outer peripheral surface of said base portion to define a radially outwardly opening, annularly extending, endless groove, a pair of radially outwardly opening axially spaced apart, annularly extending slots being formed in a radially outer surface portion of said base portion next to opposing surfaces of said side walls, and an annularly extending spring member disposed at least partially within said groove between said side walls for compressing said radially interior surface against said conduit.

2. The seal ring of claim 1 wherein said spring member comprises a garter spring.

3. The seal ring of claim 1 wherein said spring member comprises a spring ring.

4. The seal ring of claim 3 wherein said spring ring comprises a split ring having a radially but butt joint.

5. The seal ring of claim 1 wherein said seal ring comprises a split ring containing a lap joint.

6. The seal ring of claim 1 wherein said seal ring is constructed of a flexible, resilient material selected from the group consisting of polytetrafluoroethylene and plastic.

7. The seal ring of claim 1 further comprising a third annularly extending slot formed along a radial centerline of said base portion between said pair of slots, said third slot opening radially inwardly on an edge of said base portion which faces in a direction opposite said groove, said third slot extending from said opening to a third slot base which crosses an imaginary line extending between the bases of said pair of slots.

8. The seal ring of claim 7 wherein said spring member comprises a radially butt cut split ring when said seal ring and split ring are adapted for operating in an expansion mode.

9. A seal ring for providing an effective gas seal between a gas conduit and a flexible coupling or between two concentrically interposed gas conduits of different diameters, said seal ring comprising an annularly extending base portion defining a circular central bore, a radially outer peripheral surface of said base portion being adapted to fit flush around and against a surface of circular cylindrical conduit;

a pair of annularly extending, flexible, resilient, spaced apart side walls attached on and along radially outer end portions thereof to opposite sides of said base portion, radially inner end portions of said side walls projecting radially inwardly beyond a radially inner peripheral surface of said base portion to define a radially inwardly opening, annularly extending, endless groove, a pair of radially inwardly opening, axially spaced apart, annularly extending slots being formed in a radially inner surface portion of said base portion next to opposing surfaces of said side walls, and an endless, annularly extending marcel spring disposed at least partially within said groove between said side walls for expanding said radially outer surface peripheral surface of said base portion against a gas conduit.

10. The ring of claim 9 wherein said seal ring comprises a split ring containing a lap joint.

11. A seal ring comprising an annulus of flexible, resilient material having a generally U-shaped radial cross-section, a pair of legs forming axially spaced apart, annularly extending side walls and an annularly extending base portion of said cross-section together forming an endless, annularly extending central groove, a pair of annularly extending, axially spaced apart slots being formed in said base portion next to opposing surfaces of said side walls, which slots open into said groove; and a spring member disposed in said groove for urging an edge of said annulus which faces in a radial direction away from said groove to seal against an opposing, conforming, annularly extending surface against which said edge is operatively placed.

12. The seal ring of claim 11 wherein said material is selected from the group consisting of polytetrafluoroethylene and plastic.

13. The seal ring of claim 11 wherein said annulus comprises a split ring containing a lap joint.

14. The seal ring of claim 11 wherein said spring member comprises a garter spring.

15. The seal ring of claim 11 wherein said spring member comprises a Marcel spring.

16. The seal ring of claim 11 wherein said spring member comprises an uncut spring ring when said seal ring and spring ring are adapted for operation in a contracting mode.

17. The seal ring of claim 11 wherein said spring member comprises a radially butt cut split spring ring when said spring ring and split ring are adapted for operating in a contraction mode.

18. The seal ring of claim 9 further comprising a third annularly extending slot formed along a radial centerline of said base portion between said pair of slots, said third slot radially extending across an imaginary line which joins the bases of said pair of slots and opening onto an edge of said base portion which is adapted to bear upon and seal against an annularly extending surface, said edge facing in a direction opposite said groove.

19. A seal ring assembly comprising a ring forming an annulus of flexible, resilient material including an annularly extending base and a pair of axially spaced apart, annularly extending sidewalls attached on corresponding radial end portions thereof to opposite sides of said base, said base defining an annularly extending first surface facing in a first radial direction for fitting in an effectively gas sealing manner against an opposing conforming surface of a gas conduit, said base further defining an annularly extending second surface located between said sidewalls and facing in a second radial direction which is opposite said first radial direction, said second surface and opposing surfaces of said sidewalls which project radially beyond said base defining an annularly extending groove, a pair of annularly extending, axially spaced apart slots being formed in a surface portion of said base next to opposing surfaces of said sidewalls so as to open onto and around said second surface in said groove, said second surface being crowned on an annularly extending, axial centerline of said annulus and containing a pair of oppositely tapered, annularly extending surfaces which extend diagonally outwardly in opposite axial directions from said crown to form a pair of cone shaped surfaces which are inclined toward an imaginary circular cylindrical, axially directed projection of said first surface, said inclined cone shaped surfaces being on opposite angles relative to one another which are equal and which are inclined from about three degrees up to about thirty degrees, inclusive, relative to a cylindrical surface of said projection; and a pair of garter springs disposed next to one another in said groove wherein each of said springs bears upon a different one of said tapered surfaces so as to provide, in combination, a radially directed bearing force component upon said first surface to form an effectively gas tight seal against said gas conduit and so that each of said springs provides an axially outwardly directed bearing force component against a different one of said sidewalls to form an effectively gas tight seal of said sidewalls against an opposing annularly extending, ring housing surface.

20. The seal ring assembly of claim 19 wherein said annulus and said pair of garter springs are adapted to operate in a compression mode, said first surface being radially inwardly facing, said second surface being radially outwardly facing, and said groove and slots being radially outwardly opening.

21. The seal ring assembly of claim 19 wherein said annulus and pair of garter springs are adapted to operate in an expansion mode, said annulus comprising a split ring, said first surface being radially outwardly facing, said second surface being radially inwardly facing and said groove and slots being radially inwardly opening.

22. The ring assembly of claim 19 wherein said annulus comprises a split ring.

23. The ring of claim 19 wherein said annulus comprises an uncut ring.

* * * * *